(12) United States Patent
Gupta et al.

(10) Patent No.: US 7,037,964 B2
(45) Date of Patent: *May 2, 2006

(54) POLYOLEFIN FILM COMPOSITIONS WITH PERMANENT ANTIFOG PROPERTIES

(75) Inventors: Anunay Gupta, Boontoon, NJ (US); David Devore, Nyack, NY (US); John James McNamara, Putnam Valley, NY (US); Alessandro Zedda, Basel (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 39 days.

This patent is subject to a terminal disclaimer.

(21) Appl. No.: 10/880,680

(22) Filed: Jun. 30, 2004

(65) Prior Publication Data

US 2004/0234801 A1 Nov. 25, 2004

Related U.S. Application Data

(63) Continuation of application No. 09/848,014, filed on May 3, 2001, now Pat. No. 6,784,235.

(60) Provisional application No. 60/201,871, filed on May 4, 2000.

(51) Int. Cl.
*C08K 5/06* (2006.01)

(52) U.S. Cl. .................................. 524/376; 524/379

(58) Field of Classification Search ................ 524/376, 524/379
See application file for complete search history.

(56) References Cited

U.S. PATENT DOCUMENTS

| 2,462,330 A | 2/1949 | Myers .......................... 260/23 |
| 3,048,263 A | 8/1962 | Sacks et al. ............. 206/45.33 |
| 3,048,266 A | 8/1962 | Hackhel et al. .......... 206/45.34 |
| 4,189,420 A | 2/1980 | Sugimoto et al. .......... 260/31.6 |
| 4,486,552 A | 12/1984 | Niemann ..................... 523/169 |
| 4,800,115 A | 1/1989 | Havens ........................ 428/178 |
| 5,001,015 A | 3/1991 | Havens ........................ 428/516 |
| 5,262,233 A | 11/1993 | Sudo et al. .................. 428/327 |
| 5,654,086 A | 8/1997 | Nishijima et al. .......... 442/199 |
| 5,766,772 A | 6/1998 | Ciocca et al. ............... 428/516 |
| 5,804,625 A | 9/1998 | Temperante et al. ........ 524/188 |
| 6,239,047 B1 | 5/2001 | Erdos et al. ................ 442/119 |

FOREIGN PATENT DOCUMENTS

| DE | 2109030 | 2/1971 |
| EP | 0492463 | 7/1992 |
| EP | 0500073 | 8/1992 |
| EP | 0869146 | 10/1998 |
| EP | 931805 | 7/1999 |
| EP | 1055610 | 11/2000 |
| JP | 6345432 | 12/1994 |
| JP | 6345717 | 12/1994 |
| JP | 11310648 | 11/1999 |
| WO | 91/04853 | 4/1991 |
| WO | 00/28143 | 5/2000 |

OTHER PUBLICATIONS

Abstract for JP 6345717 (1994).
Abstract for JP 6345432 (1994).
Unithox® Ethoxylated Alcohols, Technical Release 4022.0, Petrolite Corp. Polymers Division, (1996).
Atmer, Antifog Agents for Agricultural and Food-Packing Films, Ciba Specialty Chemicals Corp. Polymer Additives Group.
Derwent Abstr. 61211T for DE 2109030 (1971).

*Primary Examiner*—Peter D. Mulcahy
(74) *Attorney, Agent, or Firm*—Tyler A. Stevenson

(57) ABSTRACT

Polyolefin films having incorporated therein a compound of the formula $CH_3CH_2(CH_2CH_2)_aCH_2CH_2(OCH_2CH_2)_bOH$, where a is 9 to 25 and b is 1 to 10, exhibit superior long lasting fog resistance. The polyolefin films are useful as packaging film for moist products and as a greenhouse film for agricultural applications.

8 Claims, No Drawings

POLYOLEFIN FILM COMPOSITIONS WITH PERMANENT ANTIFOG PROPERTIES

This application is a continuation of Ser. No. 09/848,014, filed May 3, 2001, now U.S. Pat. No. 6,784,235, which claims the benefit under 35 USC 119(e) of U.S. Provisional Application Ser. No. 60/201,871, filed May 4, 2000.

This invention relates to novel olefin polymer compositions which are resistant to fogging, especially when employed as a packaging film for moist products and as a greenhouse film for agricultural applications.

Greenhouse Film for Agricultural Applications

Agricultural films which are largely used in greenhouse culture or tunnel culture chiefly include soft ethylene resin films which are about 30 to 200 microns thick and which comprise, as a base resin, polyvinyl chloride (hereinafter abbreviated as PVC), branched low-density polyethylene (hereinafter abbreviated as LDPE), ethylene-vinyl acetate copolymers (hereinafter abbreviated as EVA), linear low-density polyethylene (hereinafter abbreviated as LLDPE), etc. Of the various properties required for the agricultural films, particularly important are weather resistance, anti-fogging properties, heat-retaining properties, and transparency. To cope with the recent situation confronting agriculture such as an increased cost and a shortage of labor, development of films having an extended duration of life before re-placement is desired.

The atmosphere within greenhouses or tunnels surrounded by an agricultural film is saturated with water vapor which evaporates from the soil or plants, and the water vapor dropwise condenses on the inner surface of a cold film to cause fogging. Water droplets on the film not only greatly reduce the incident sunlight due to irregular reflection but the droplets fall on the plants resulting in frequent occurrence of diseases.

To avoid fogging, antifog treatments on the inner surface of an agricultural film converting the film into an anti-stick water film and preventing adhesion of water droplets have been used thereby assuring transmission of sunlight into the greenhouse or tunnel, raising the soil temperature and air temperature within the greenhouse or tunnel, accelerating photosynthesis of the plants, accelerating healthy growth of the plants, and controlling the occurrence of plant diseases.

Currently employed antifog treatments include incorporation of an anti-fogging agent (antifog additive) into a film-forming ethylene resin compound and coating of an anti-fogging agent on a film.

However, an anti-fogging film obtained by coating a soft plastic film with an anti-fogging agent has not yet been employed practically as an agricultural film for the following reasons. Because of their low surface energy, soft plastic films for agricultural use generally have poor wettability and adhesion when coated with surface active agents or hydrophilic high polymeric substances which have been used as anti-fogging agents. This tendency is particularly conspicuous with soft ethylene resin films of low polarity, e.g., LDPE, EVA, and LLDPE films. Therefore, where an anti-fogging agent is spray coated with a power atomizer onto a soft ethylene resin film, the anti-fogging agent needs to be used in a large quantity and this increases cost, and a large amount of time is required for spray coating operation. Further, spray coating cannot be effected uniformly with insufficient anti-fogging effects arising. Where an anti-fogging agent is applied using a coater, etc., a large quantity of a coating is consumed, and the coating speed cannot be increased, resulting in an increase of cost. In either case, the coated anti-fogging agent is washed away together with running water droplets due to poor adhesion resulting in a very short life for the anti-fogging properties. Furthermore, the coated film undergoes blocking due to the stickiness of the anti-fogging agent. As a result, it has been impossible to retain anti-fogging effects in a stable manner for a long duration of at least 1 year, more desirably, several years. Most of the state-of-the-art agricultural films exhibit anti-fogging properties for a period of only about 1 month.

Anti-fogging agents commonly incorporated into the films include nonionic, anionic and cationic surface active agents.

Other methods for providing anti-fogging properties to agricultural films, in addition to the coating method and incorporation method, include chemical modification of the ethylene base resin or the ethylene resin film surface by introducing a polar group, such as a hydrophilic group. This technique, however, entails high cost at the present time and is difficult to apply to agricultural films.

On the other hand, coating type anti-fogging agents mainly comprising an inorganic hydrophilic colloidal substance and a hydrophilic organic compound have recently been developed as disclosed, e.g., in JP63-45432, JP63-45717, and JP64-2158. Suitable inorganic hydrophilic colloidal substances include colloidal silica, colloidal alumina, colloidal $Fe(OH)_2$, colloidal $Sn(OH)_4$, colloidal $TiO_2$, colloidal $BaSO_4$, and colloidal lithium silicate, with colloidal silica and colloidal alumina most generally used. Suitable hydrophilic organic compounds include various nonionic, anionic or cationic surface active agents; graft copolymers mainly comprising a hydroxyl-containing vinyl monomer unit and from 0.1 to 40% by weight of a carboxyl-containing vinyl monomer unit or a partial or complete neutralization product thereof; and sulfo-containing polyester resins.

Coating type anti-fogging agents used with this new film type have markedly improved wettability and adhesion and coated agricultural films exhibiting anti-fogging properties for a duration of about a half year to about 1 year are provided.

Under these circumstances, none of the state-of-the-art polyolefin-based agricultural films satisfies the requirements of long lasting anti-fogging properties.

Packaging Film for Moist Products

In the field of packaging, whereby polymer films are used for covering or enclosing items of sale, and where film clarity or good optical properties are desired, there is a recognized need for polymer films which resist fogging when exposed to conditions of temperature and humidity which can produce condensation on the film. This condensation is especially troublesome when the interior of the package contains enough moisture to produce fogging of the interior surface of the film. Of special interest here is the packaging of food products, such as meats, bakery items, vegetables, fruits, and the like, though non-food items are also of interest.

Food products are often packaged in polymeric film for ease in handling by customers, to provide sanitary protection of the food product from the environment, to provide an easier and more economical wrapping than paper, or to provide a better view of the food product. Various polymeric materials such as polyvinyl chloride, poly(ethylene/vinyl acetate) and irradiated polyethylenes have been used in the food wrap market with plasticized polyvinyl chloride (PVC) being widely used in the market. Freshly cut meat and vegetables are often packaged in these films, and certain properties are desired of the film for it to perform satisfactorily as a food overwrap. Obviously, film used in this application should have good "see through" clarity so the product can be viewed. High gloss is desired to add "sparkle" to the packages for aesthetic appeal to the customers. As these food products are packaged, they generally experience a temperature change from where they are packaged to where they are stored or sold. This temperature change can cause the formation of water droplets on the inside surface of the film (commonly called "fog"). These water droplets are usually objectionable because they hinder the view of the food products from the consumer and can cause spoilage, particularly to certain vegetables. To prevent water from condensing in droplets, an antifog agent is often added to the film. The antifog agents reduce the surface tension of the water and cause the water to form a continuous sheet, which is then transparent.

There is a perceived need in the market place for improved packaging films, especially for food products, where the widely used plasticized polyvinylchloride (PVC) requires replacement by a more acceptable film. Much of the PVC which has been used is plasticized with additives, e.g. dioctyl phthalate, which are becoming less acceptable in the market.

U.S. Pat. No. 4,189,420 discloses, inter alia, certain ethylene polymers blended with a polybutene and a mixed glyceride having at least one acyl group of 2 to 6 carbon atoms and at least one acyl group containing 8 to 22 carbon atoms.

U.S. Pat. No. 3,048,266 discloses, inter alia, an antifog agent of polyethylene oxide derivative in a polyolefin composition.

U.S. Pat. No. 3,048,263 discloses, inter alia, a polyolefin antifog agent comprising a monoglyceride of a fatty acid.

U.S. Pat. No. 2,462,331 discloses, inter alia, the incorporation into polyethylene of polyhydric alcohol esters or metal salts of either saturated or unsaturated monocarboxylic fatty acids.

U.S. Pat. No. 5,262,233 discloses agricultural films which may have incorporated therein an anti-fogging agent which may be a poly(ethylene oxide) of a long chain alcohol.

U.S. Pat. No. 4,486,552 discloses fog-resistant packaging films having incorporated therein (1) an alkoxylated alkyl phenol along with (or in combination with) a mixed mono-, di- and/or triglyceride, or (2) a polyoxyalkylene fatty acid ester, or (3) a combination of (2) and any part of (1) above.

U.S. Pat. No. 5,001,015 discloses polyolefin films with antistatic properties which include as possible antistatic agents the reaction products of polyalkoxylates with fatty alcohols.

Atmer® 502, is described in a September, 1998 data sheet as having long-lasting antifog properties in LDPE agricultural film. Atmer® 502 is a 2 mole ethoxylated stearyl alcohol, $C_{18}H_{37}(OCH_2CH_2)_2OH$. Atmer® is a trademark of Uniqema.

DETAILED DISCLOSURE

The present invention pertains to polyolefin film compositions with anti-fogging properties comprising
(a) a polyolefin film; and
(b) at least one compound of the formula $CH_3CH_2(CH_2CH_2)_aCH_2CH_2(OCH_2CH_2)_bOH$ where a is 9 to 25 and b is 1 to 10.

In the compounds of the formula $CH_3CH_2(CH_2CH_2)_aCH_2CH_2(OCH_2CH_2)_bOH$ of component (b), the term "a" is for example 9, 10, 11, 12, 13, 14, 15, 16, 17, 18, 19, 20, 21, 22, 23, 24 or 25. The term "b" is for example 1, 2, 3, 4, 5, 6, 7, 8, 9, or 10.

Examples for polyolefins are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

i) radical polymerization (normally under high pressure and at elevated temperature).

ii) catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either p- or s-coordinated. These metal complexes may be in the free form or fixed on substrates, typically on activated magnesium chloride, titanium(III) chloride, alumina or silicon oxide. These catalysts may be soluble or insoluble in the polymerization medium. The catalysts can be used by themselves in the polymerization or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler Natta), TNZ (DuPont), metallocene or single site catalysts (SSC).

2. Mixtures of the polymers mentioned under 1.), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copdymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EM), LLDPE/EVA, LLDPE/EAA and alternating or random polyalkylene/carbon monoxide copolymers and mixtures thereof with other polymers, for example polyamides.

Preferred polyolefins are polyethylene or polypropylene and their copolymers with mono- and diolefins.

The ethylene polymers of the present invention are those that are characterized as having a melt index or melt flow value, in the range of about 0.01 to about 20 gms/10 min. as measured by ASTM-D-1238, condition E, and a density in the range of about 0.9 to about 0.96 gms./cc. This includes the branched polymers made at high pressure with a free-radical initiator and those made at low, medium, or high pressure using a coordination catalyst which gives the linear (i.e. substantially non-branched) polymers. Those made using a free-radical initiator (e.g. peroxy compounds) have become known in the art as "low density polyethylene" (LDPE) and those made using a coordination catalyst (e.g. a "Ziegler-type catalyst) have become known as "high density polyethylene" (HDPE).

More recently developed commercially are the so-called "linear low density polyethylenes" (LLDPE) which are prepared using a coordination catalyst, but which, because of the presence of minor amounts of copolymerized higher olefins (especially olefins of 4–10 carbon atoms) have a density lower than HDPE, yet the arrangement of polymerized molecular units is of the linear type.

It is also contemplated within the purview of the present invention to employ ethylene polymers which contain other comonomers, such as acrylic acid, methacrylic acid, alkyl acrylates, vinyl esters, and carbon monoxide. These type of monomers, which contain oxygen atoms, are employed using a free-radical initiator, but are not very well suitable when coordination catalysts are employed. The coordination catalysts, which generally contain metal-carbon bonds, are usually poisoned or deactivated by compounds containing oxygen-carbon bonds or hydrogen-oxygen bonds when employed in quantities such as are involved in copolymerization thereof. On the other hand, copolymerization of ethylene with the higher hydrocarbon olefins is best done using a coordination type catalyst.

In the present invention, it is preferred that the ethylene polymer be of the LLDPE variety, especially those which have a melt flow value in the range of about 0.1–10 and enough comonomer units to give a density in the range of about 0.9 to about 0.935 gms./cc, such comonomer units being an aliphatic hydrocarbon olefin of from 4 to 8 carbon atoms, including isomers in that range. These LLDPE polymers are recognized in the art as having excellent strength, resistance to tear propagation as shown by Dart Impact and Elmendorf Tear, and exhibit good resistance to tearing or puncturing when stressed against articles having protuberances. This preference for the LLDPE variety is especially important in food packaging applications and most especially in packaging of red meat.

The fog-resistant films of this invention are prepared by producing a film of a formulation comprising a polyolefin having incorporated therein an A-B diblock copolymer antifog agent. These copolymers are of the structure $$CH_3CH_2(CH_2CH_2)_aCH_2CH_2(OCH_2CH_2)_bOH$$

where a is 9 to 25 and b is 1 to 10. The present compositions comprise for example an A-B diblock compound where a has an average value of 13 and b has an average value of 2.5.

The polymer formulations of the present invention preferably contain an amount of the antifog agent in the range of about 0.1% to about 4%, most preferably an amount in the range of about 0.5% to about 3%, based on the overall weight of the formulation.

The present compositions may comprise other known antifog additives, such as alkoxylated ethers, e.g. Atmer® 502, sorbitan esters, e.g. Atmer® 103, other known non-ionic, anionic and cationic surface active agents as disclosed in the foregoing U.S. Patents, e.g., polyoxyalkylene fatty acid esters, alkoxylated phenols, mixed mono-, di-, or triglycerides, fatty acid esters of polyhydroxy alcohols, other polyalkoxylated compounds and the like. Atmer® is a trademark of ICI Americas.

Copending U.S. application Ser. No. 60/179,567, filed Feb. 1, 2000, incorporated herein by reference, discloses plastic films for food protection that comprise ultraviolet light absorbers. The present polyolefin films with fog resistance may also contain further appropriate additives such as ultraviolet light absorbers, hindered amine light stabilizers, antioxidants, processing aids and other additives as disclosed in copending application Ser. No. 60/179,567.

For example, the compositions of the invention may optionally also contain from about 0.01 to about 10%, preferably from about 0.025 to about 5%, and especially from about 0.1 to about 3% by weight of various conventional stabilizer coadditives, such as the materials listed below, or mixtures thereof.

1. Antioxidants 1.1. Alkylated Monophenols, for Example,
2,6-di-tert-butyl-4-methylphenol
2-tert-butyl-4,6-dimethylphenol
2,6-di-tert-butyl-4-ethylphenol
2,6-di-tert-butyl-4-n-butylphenol
2,6-di-tert-butyl-4-1-butylphenol
2,6-di-cyclopentyl-4-methylphenol
2-(α-methylcyclohexyl)-4,6-dimethylphenol
2,6-di-octadecyl-methylphenol
2,4,6-tri-cyclohexylphenol
2,6-di-tert-butyl-4-methoxymethylphenol 1.2. Alkylated Hydroquinones, for Example.
2,6-di-tert-butyl-4-methoxyphenol
2,5-di-tert-butyl-hydroquinone
2,5-di-tert-amyl-hydroquinone
2,6-diphenyl-4-octadecyloxyphenol 1.3. Hydroxylated Thiodiphenyl Ethers, for Example.
2,2'-thio-bis-(6-tert-butyl-4-methylphenol)
2,2'-thio-bis-(4-octylphenol)
4,4'-thio-bis-(6-tert-butyl-3-methylphenol)
4,4'-thio-bis-(6-tert-butyl-2-methylphenol)

1.4. Alkylidene-Bisphenols, for Example.
2,2'-methylene-bis-(6-tert-butyl-4-methylphenol)
2,2'-methylene-bis-(6-tert-butyl-4-ethylphenol)
2,2'-methylene-bis-[4-methyl-6-(α-methylcyclohexyl)-phenol]
2,2'-methylene-bis-(4-methyl-6-cyclohexylphenol)
2,2'-methylene-bis-(6-nonyl-4-methylphenol)
2,2'-methylene-bis-[6-(α-methylbenzyl)-4-nonylphenol]
2,2'-methylene-bis-[6-(α,α-dimethylbenzyl)-4-nonylphenol]
2,2'-methylene-bis-(4,6-di-tert-butylphenol)
2,2'-ethylidene-bis-(4,6-di-tert-butylphenol)
2,2'-ethylidene-bis-(6-tert-butyl-4-isobutylphenol)
4,4'-methylene-bis-(2,6-di-tert-butylphenol)
4,4'-methylene-bis-(6-tert-butyl-2-methylphenol)
1,1-bis-(5-tert-butyl-4-hydroxy-2-methylphenyl)-butane 2,6-di-(3-tert-butyl-5-methyl-2-hydroxybenzyl)-4-methylphenol
1,1,3-tris-(5-tert-butyl-4-hydroxy-2-methylphenyl)-butane
1,1-bis-(5-tert-butyl-4-hydroxy-2-methylphenyl)-3-n-dodecylmercaptobutane ethyleneglycol bis-[3,3-bis-(3'-tert-butyl-4'-hydroxyphenyl)-butyrate]
di-(3-tert-butyl-4-hydroxy-5-methylphenyl)-dicyclopentadiene
di-[2-(3'-tert-butyl-2'-hydroxy-5'-methyl-benzyl)-6-tert-butyl-4-methylphenyl] terephthalate.

1.5. Benzyl Compounds, for Example.
1,3,5-tri-(3,5-di-tert-butyl-4-hydroxybenzyl)-2,4,6-trimethylbenzene
di-(3,5-di-tert-butyl-4-hydroxybenzyl) sulfide
3,5-di-tert-butyl-4-hydroxybenzyl-mercapto-acetic acid isooctyl ester
bis-(4-tert-butyl-3-hydroxy-2,6-dimethylbenzyl)dithiol terephthalate
1,3,5-tris-(3,5-di-tert-butyl-4-hydroxybenzyl) isocyanurate
1,3,5-tris-(4-tert-butyl-3-hydroxy-2,6-dimethylbenzyl) isocyanurate
3,5-di-tert-butyl-4-hydroxybenzyl-phosphoric acid dioctadecyl ester
3,5-di-tert-butyl-4-hydroxybenzyl-phosphoric acid monoethyl ester, calcium-salt 1.6. Acylaminophenols, for Example.
4-hydroxy-lauric acid anilide
4-hydroxy-stearic acid anilide
2,4-bis-octylmercapto-6-(3,5-tert-butyl-4-hydroxyanilino)-s-triazine
octyl-N-(3,5-di-tert-butyl-4-hydroxyphenyl)-carbamate 1.7. Esters of b-(3,5-di-tert-butyl-4-hydroxyphenyl)-propionic acid with monohydric or polyhydric alcohols, for example,

| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |
| triethanolamine | triisopropanolamine |

1.8. Esters of b-(5-tert-butyl-4-hydroxy-3-methylphenyl)-propionic acid with monohydric or polyhydric alcohols, for example,

| methanol | diethylene glycol |
| octadecanol | triethylene glycol |
| 1,6-hexanediol | pentaerythritol |
| neopentyl glycol | tris-hydroxyethyl isocyanurate |
| thiodiethylene glycol | di-hydroxyethyl oxalic acid diamide |
| triethanolamine | triisopropanolamine |

1.9. Amides of b-(3,5-di-tert-butyl-4-hydroxyphenyl)-propionic acid for example,
N,N'-di-(3,5-di-tert-butyl-4-hydroxyphenylpropionyl)-hexamethylenediamine
N,N'-di-(3,5-di-tert-butyl-4-hydroxyphenylpropionyl)-trimethylenediamine
N,N'-di-(3,5-di-tert-butyl-4-hydroxyphenylpropionyl)-hydrazine.

2. UV Absorbers and Light Stabilizers 2.1. 2-(2'-Hydroxyphenyl)-benzotriazoles, for example, 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-( 3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl) phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy) carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-6-2H-benzotriazol-2-yl-phenol), 2-(2-hydroxy-3α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3,5-di-α-cumyl-phenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-α-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

2.2. 2-Hydroxy-benzophenones, for example, the 4-hydroxy-, 4-methoxy-, 4-octoxy, 4-decyloxy-, 4-dodecyloxy-, 4-benzyloxy, 4,2',4'-trihydroxy- and 2'-hydroxy-4,4'-dimethoxy derivatives.

2.3. Esters of optionally substituted benzoic acids for example, phenyl salicylate, 4-tert-butylphenyl salicylate, octylphenyl salicylate, dibenzoylresorcinol, bis-(4-tert-butylbenzoyl)-resorcinol, benzoylresorcinol, 3,5-di-tert-butyl-4-hydroxybenzoic acid 2,4-di-tert-butylphenyl ester and 3,5-di-tert-butyl-4-hydroxybenzoic acid hexadecyl ester.

2.4. Acrylates and malonates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, Sanduvor® PR25 and PR31.

2.5. Sterically hindered amines, for example bis-(2,2,6,6-tetramethylpiperidyl) sebacate, bis-(1,2,2,6,6-pentamethylpiperidyl) sebacate, n-butyl-3,5-di-tert.butyl-4-hydroxybenzyl malonic acid bis-(1,2,2,6,6-pentanemethylpiperidyl) ester, condensation product of 1-hydroxyethyl-2,2,6,6-tetramethyl-4-hydroxypiperidine and succinic acid, condensation product of N,N'-(2,2,6,6-tetra-methylpiperidyl)-hexamethylenediamine and 4-tert-octylamino-2,6-dichloro-s-triazine, tris-(2,2,6,6-tetramethylpiperidyl)-nitrilotriacetate, tetrakis-(2,2,6,6-tetramethyl-4-piperidyl) 1,2,3,4-butanetetracarboxylate, 1,1'(1,2-ethanediyl)-bis-(3,3,5,5-tetramethylpiperazinone), bis(1-octyloxy-2,2,6,6-tetramethylpiperidin-4-yl) sebacate.

2.6. Sterically hindered amines substituted on the N-atom by a hydroxy-substituted alkoxy group, for example compounds disclosed in copending application Ser. No. 09/257,711, and whose relevant parts are also incorporated herein by reference, such as 1-(2-hydroxy-2-methylpropoxy)-4-octadecanoyloxy-2,2,6,6-tetramethylpiperidine, 1-(2-hydroxy-2-methylpropoxy)-4-hydroxy-2,2,6,6-tetramethylpiperidine, 1-(2-hydroxy-2-methylpropoxy)-4-oxo-2,2,6,6-tetramethylpiperidine, bis(1-(2-hydroxy-2-methylpropoxy)-2,2,6,6-tetramethylpiperidin-4-yl) sebacate, bis(1-(2-hydroxy-2-methylpropoxy)-2,2,6,6-tetramethylpiperidin-4-yl) adipate, bis(1-(2-hydroxy-2-methylpropoxy)-2,2,6,6-tetramethylpiperidin-4-yl) succinate, bis(1-(2-hydroxy-2-methylpropoxy)-2,2,6,6-tetramethylpiperidin-4-yl) glutarate and 2,4-bis(N-[1-(2-hydroxy-2-methylpropoxy)-2,2,6,6-tetramethylpiperidin-4-yl]-N-butylamino}-6-(2-hydroxyethylamino)-s-triazine.

2.7. Oxalic acid diamides, for example, 4,4'-di-octyloxy-oxanilide, 2,2'-di-octyloxy-5,5'-di-tert-butyl-oxanilide, 2,2'-di-dodecyloxy-5,5'-di-tert-butyl-oxanilide, 2-ethoxy-2'-ethyl-oxanilide, N,N'-bis (3-dimethylaminopropyl)-oxalamide, 2-ethoxy-5-tert-butyl-2'-ethyloxanilide and its mixture with 2-ethoxy-2'-ethyl-5,4'-di-tert-butyloxanilide and mixtures of ortho- and para-methoxy- as well as of o- and p-ethoxy-disubstituted oxanilides.

2.8. Hydroxyphenyl-s-triazines, for example 4,6-bis-(2,4-dimethylphenyl)-2-(2-hydroxy-4-octyloxyphenyl)-s-triazine, Cyasorb® 1164, Cytec Corp., 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxyethoxy)phenyl]-6-(4-chlorophenyl)-s-triazine, 2,4-bis[2-hydroxy-4-(2-hydroxy-4-(2-hydroxyethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy) phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine, 2,4-bis(2,4-dimethylphenyl)-6-[2-hydroxy-4-(3-benzyloxy-2-hydroxypropyloxy) phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)phenyl]-5-α-cumylphenyl]-s-triazine (* denotes a mixture of octyloxy, nonyloxy and decyloxy groups) methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonylsopropylideneoxy-phenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis [2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl]-s-triazine, mixture of 4,6-bis-(2,4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, Tinuvin® 400, Ciba Specialty Chemicals Corp., 4,6-bis-(2,4-dimethylphenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

3. Phosphites and phosphonites, for example, triphenyl phosphite, diphenylalkyl phosphites, phenyldialkyl phosphites, tri-(nonylphenyl) phosphite, trilauryl phosphite, trioctadecyl phosphite, di-stearyl-pentaerythritol diphosphite, tris-(2,4-di-tert-butylphenyl) phosphite, di-isodecyl-pentaerythritol diphosphite, di-(2,4,6-tri-tert-butylphenyl)-pentaerythritol diphosphite, di-(2,4-di-tert-butyl-6-methylphenyl)-pentaerythritol diphosphite, di-(2,4-di-tert-butylphenyl)pentaerythritol diphosphite, tristearyl-sorbitol triphosphite, tetrakis-(2,4-di-tert-butylphenyl) 4,4'-diphenylylenediphosphonite.

4. Compounds which destroy peroxide, for example, esters of b-thiodipropionic acid, for example the lauryl, stearyl, myristyl or tridecyl esters, mercapto-benzimidazole or the zinc salt of 2-mercaptobenzimidazole, zinc dibutyl-dithiocarbamate, dioctadecyl disulfide, pentaerythritol tetrakis-(b-dodecylmercapto)-propionate.

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecyhydroxyl amine, N-heptadecyl-N-octadecylhydroxylamine, N,N-dialkylhydroxylamine derived from hydrogenated tallow amine.

6. Nitrones, for example, N-benzyl-alpha-phenyl nitrone, N-ethyl-alpha-methyl nitrone, N-octyl-alpha-heptyl nitrone, N-lauryl-alpha-undecyl nitrone, N-tetradecyl-alpha-tridecyl nitrone, N-hexadecyl-alpha-pentadecyl nitrone, N-octadecyl-alpha-pentadecyl nitrone, N-hexadecyl-alpha-heptadecyl nitrone, N-octadecyl-alpha-pentadecyl nitrone, N-heptadecyl-alpha-heptadecyl nitrone, N-octadecyl-alpha-hexadecyl nitrone, nitrone derived from N,N-dialkylhydroxylamine derived from hydrogenated tallow amine.

7. Amine oxides, for example amine oxide derivatives as disclosed in U.S. Pat. Nos. 5,844,029 and 5,880,191, didecyl methyl amine oxide, tridecyl amine oxide, tridodecyl amine oxide and trihexadecyl amine oxide.

8. Polyamide stabilizers, for example copper salts in combination with iodides and/or phosphorus compounds and salts of divalent manganese.

9. Basic co-stabilizers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg stearate, Na ricinoleate and K palmitate, antimony pyrocatecholate or zinc pyrocatecholate.

10. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

11. Fillers and reinforcing agents, for example, calcium carbonate, silicates, glass fibers, asbestos, talc, kaolin, mica, barium sulfate, metal oxides and hydroxides, carbon black, graphite.

12. Other additives, for example, for example, plasticizers, lubricants, emulsifiers, pigments, rheology additives, catalysts, flow-control agents, optical brighteners, clarifiers such as substituted and unsubstituted bisbenzylidene sorbitols, flameproofing agents, anti-static agents, blowing agents and thiosynergists such as dilauryl thiodipropionate or distearyl thiodipropionate.

13. Benzofuranones and indolinones, for example those disclosed in U.S. Pat. No. 4,325,863, U.S. Pat. No. 4,338,244 or U.S. Pat. No. 5,175,312, or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hy-droxyethoxy]phenyl) benzofuran-2-one], 5,7-di-tert-butyl-3-(4-ethoxyphenyl) benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butyl-benzofuran-2-one.

14. Nickel compounds, for example nickel complexes of 2,2'-thio-bis-[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyidithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

The mixing of the antifog agents into the polyolefin is done by mixing it into molten polymer by commonly used techniques such as roll-milling, mixing in a Banbury type mixer, or mixing in an extruder barrel and the like. The heat history (time at which held at elevated temperature) can be shortened by mixing the antifog agent with unheated polymer particles so as to achieve substantially even distribution of the agent in the mass of polymer, thereby reducing the amount of time needed for intensive mixing at molten temperature.

Conveniently, the antifog agent can also be added substantially simultaneously or sequentially with any other additives (colorants, tackifiers, slip agents, block agents, and the like) which may be desired in certain instances. The antifog agents may also be preblended with other additives and the blend then added to the polymer. It is contemplated that in some instances these antifog agents should have the additional benefit of aiding the other additives to become more easily or evenly dispersed or dissolved in the polyolefin. For easier batch-to-batch control of quality, it may be preferred to employ concentrated masterbatches of polymer/agent blends which are subsequently blended, as portions, to additional quantities of polymer to achieve the final desired formulation. The masterbatch, or the neat additives, may be injected into freshly prepared polymer while the polymer is still molten and after it leaves the polymerization vessel or train, and blended therewith before the molten polymer is chilled to a solid or taken to further processing. It is within the purview of the present invention to employ blends or alloys of olefin polymers, whether they be of the above described LDPE, LLDPE, HDPE or other olefin polymers or copolymers made using a free-radical initiator or a coordination catalyst. Polypropylene is an example of an olefin polymer made using a coordination catalyst (e.g. the well-known Ziegler or Natta catalysts or variations thereof) yet which inherently exhibits a low density compared to polyethylene.

It is well known in the art that polybutene or polyisobutylene is an effective tackifier or cling agent when mixed in polyethylene. In packaging processes, good cling properties are desirable in instances wherein the film is expected to cling to itself until pulled apart or until heat-sealed, as the case may be. The polybutenes or polyisobutylenes usually employed for this purpose are generally used in small quantities of only a few percentage points of the total and are usually of low or relatively low molecular weight, having weight average mol weights in the range of from several hundred to a few thousand. The use of such tackifiers is preferred in certain of the formulations contemplated as being within the purview of the present invention, especially in meat packaging (and the like) where it is desired that substantially no liquid leaks occur during the packaging operation until heat-sealed, or during shipping, storage, and handling after being heat-sealed.

The making of films of polyolefins is well-known and includes the techniques of casting films as thin sheets through narrow slit dies, and the blown-film technique wherein an extruded tube of molten polymer is inflated to the desired "bubble" diameter and/or film thickness before being cooled and collected or further processed. These present formulations are also suitable in coextrusion fabrication of films wherein two or more films comprise a multi-layer structure. The antifog agents of the present invention can exude through an adjacent film layer which does not contain the antifog agent, thereby rendering the adjacent layer resistant to fogging.

In one preferred aspect, the invention comprises a composition of an polyolefin resin and additives to form a film suitable for a red meat overwrap. Polyolefin resins have the needed strength, optical, and gas permeability properties required for this market. However, they lack the wettability required to prevent moisture droplet formation in the package at lower temperatures. To solve the wettability problem, anti-fogging agents (such as mono- and diglycerides) commonly used in plasticized PVC film were tried in polyolefin resins. These additives were not as effective in polyolefin resins as they were in plastcized PVC film. The lack of plasticizers in polyolefin films might contribute to the difference observed in anti-fogging agents' behavior. Anti-fogging agents must be able to exude to the surface of the film where they can be effective, but not be abraded from the surface of the film. Anti-fogging agents that can be easily removed by water or by abrasion from the surface of the film are not desirable because the anti-fogging agents could flavor the meat, and the film would not be fog resistant. Thus, the invention comprises the unique composition of an polyolefin resin and an effective anti-fogging agent that is not easily abraded from the surface of the film. The use for this mixture of polyolefin resin and anti-fogging agent can be in food overwrap (meat, vegetables, etc.), greenhouse film, or other applications where a clear film with wettability or non-fogging is needed.

This invention differs from the widely used PVC red meat overwrap and produce wrap in that the base resin is a polyolefin instead of polyvinyl chloride resin. Polyolefin resin has the advantage of not requiring plasticizers (e.g. dioctyl phthalate) such as required and used in PVC films. Antifog agents perform differently in the two different classes of resin. Due to the plasticizers in PVC film, antifog agents are not as easily washed off the surface of the film. Thus, not all antifog agents that work in plasticized PVC film will work in polyolefin resin films.

Also, the present invention incorporates the anti-fogging agent within the resin instead of applying it as a coating. The incorporation of the additive into the resin is less expensive, less labor intensive, and more consistent than coatings applied to the surface of the film. Thus, the present invention utilizes anti-fogging agents that maintain their anti-fogging ability on the surface of the film even when the film has experienced abrasion. This aspect is important during the wrapping of food products so as to prevent the food products from absorbing the anti-fogging agent and to maintain the wettability of the film in the package.

Furthermore, the present invention allows the antifog agents to be incorporated into the resin, and the resin made into film by standard techniques with no additional treatment needed. No irradiation or heat aging is necessary to cause the antifog agent to exude to the surface of the film where it is then effective. The antifog agents exude to the surface of the film within approximately 48 hours after fabrication.

The polyolefin films of this invention with antifog properties are advantageously used for greenhouse films and for films used for food packaging applications.

The following examples are to illustrate some particular embodiments, but the present invention is not limited to the particular ones illustrated.

EXAMPLE 1

In order to evaluate the antifogging properties of the claimed compounds in LDPE films, they are incorporated in the polymer according the following procedure: Appropriate amounts of each compound are weighed and added to LDPE pellets (Riblene FF 29, supplied by Polimeri Europa, Milan, Italy), characterized by a density of 0.921 g/cm³ and a melt flow index (190° C., 2.16 Kg) of 0.6, in order to obtain formulations containing 1, 1.5 or 2% by weight of each compound. The granules so obtained are blown in a semi-industrial Dolci blow-extruder at a maximum temperature of 210° C. to give films 150 μm thick.

Anti-fogging Test Method

Films are evaluated according to the hot fog test A 250 mL glass beaker, containing about 50 mL of water and covered with the film to be evaluated, is immersed to about % of its height in a water bath at 60° C. Films are observed at defined intervals from the start of the experiment and a conventional notation ranging from A to E is assigned. Results are in Table 1.

| Rating for Hot fog Tests: | | | |
|---|---|---|---|
| Description | Performance | Rating | Comments |
| An opaque layer of small fog droplets | None | A | Zero visibility, poor light transmission |
| An opaque layer of large droplets | None | B | Zero visibility, poor light transmission |
| A complete layer of large transparent droplets | Poor | C | Poor visibility, lens effect, dripping |
| Randomly scattered large transparent droplets | Fair | D | Discontinuous film of water |
| Few small or large transparent droplets | Good | D/E | Disc. film of water, mostly transparent |
| A transparent film displaying no visible water | Excellent | E | Completely transparent |

TABLE 1

| Additive | MW | a | b | Hrs at D/E Hot fog test |
|---|---|---|---|---|
| none | — | — | — | (contstant B/C rating) |
| 1% Atmer ® 103 | 430 | — | — | 500 |
| 1% 98-0218 | 575 | 13 | 2.5 | 650 |
| 1% 98-0216 | 875 | 23 | 4 | 1100 |
| 1.5% Atmer ® 502 | 344 | 7 | 2 | 350 |
| 1.5% 98-0218 | 575 | 13 | 2.5 | 1950 |
| 2% Atmer ® 103 | 430 | — | — | 750 |
| 2% 98-0218 | 575 | 13 | 2.5 | 2400 |
| 2% 98-0216 | 875 | 23 | 4 | 1500 |

Additives are of the formula $CH_3CH_2(CH_2CH_2)_a CH_2CH_2(OCH_2CH_2)_b OH$, and the indices a and b are average values and refer to this formula.

A high number of hours at antifog rating of D/E is desired. It is seen that antifog additives of the present invention provide superior long lasting results.

EXAMPLE 2

Example 1 is repeated to obtain formulations containing 1 or 2% by weight of the additives of Table 2; films of about 75 μm are obtained.

Films are evaluated according the hot fog test as described in Example 1. Results are found in the table below.

TABLE 2

| Additive | MW | a | b | Hrs at D/E Hot fog test |
|---|---|---|---|---|
| 1% Atmer ® 103 | 430 | — | — | 175 |
| 1% 98-0218 | 575 | 13 | 2.5 | 1100 |
| 1% 98-0216 | 875 | 23 | 4 | 350 |
| 1% 98-0222 | 920 | 13 | 10.5 | 150 |
| 1% 98-0224 | 1100 | 18 | 12.5 | 50 |
| 2% Atmer ® 103 | 430 | — | — | 200 |
| 2% 98-0218 | 575 | 13 | 2.5 | 1200 |

Additives are of the formula $CH_3CH_2(CH_2CH_2)_a CH_2CH_2(OCH_2CH_2)_bOH$, and the indices a and b are average values and refer to this formula.

A high number of hours at antifog rating of D/E is desired. It is seen that antifog additives of the present invention provide superior long lasting results.

What is claimed is:

1. A fog-resistant polyolefin film composition comprising
   (a) a polyolefin film; and
   (b) at least one compound of the formula $CH_3CH_2(CH_2CH_2)_a CH_2CH_2(OCH_2CH_2)_bOH$ where a is 10 to 25 and b is 1 to 10,
   wherein component (b) is incorporated into the polyolefin film.

2. A composition according to claim 1 in which the polyolefin is polyethylene.

3. A composition according to claim 1 in which the polyolefin film is a greenhouse film.

4. A composition according to claim 1 in which the polyolefin film is a food packaging film.

5. A composition according to claim 1 where component (b) is present from about 0.1% to about 4%, based on the weight of the composition.

6. A composition according to claim 1 further comprising antifog additives selected from the group consisting of the alkoxylated ethers, sorbitan esters, polyoxyalkylene fatty acid esters, alkoxylated phenols, mixed mono-, di-, or triglycerides, fatty acid esters of polyhydroxy alcohols and other polyalkoxylated compounds.

7. A composition according to claim 1 further comprising one or more stabilizers selected from the group consisting of the antioxidants, sterically hindered amine light stabilizers, phosphites or phosphonites, hydroxylamines and hydroxyphenylbenzotriazole, hydroxybenzophenone or hydroxyphenyl-s-triazine UV absorbers.

8. A composition according to claim 1 where b is 1 to 6.

* * * * *